(12) United States Patent
Manfredi et al.

(10) Patent No.: US 7,734,609 B2
(45) Date of Patent: Jun. 8, 2010

(54) MULTI-LEVEL REPUTATION BASED RECOMMENDATION SYSTEM AND METHOD

(75) Inventors: Gary Manfredi, Los Angeles, CA (US);
Kim Scheibel, Los Angeles, CA (US);
Jakob Darger, London (GB)

(73) Assignee: Firehose, LLC, Los Angeles, CA (US)

( * ) Notice: Subject to any disclaimer, the term of this patent is extended or adjusted under 35 U.S.C. 154(b) by 372 days.

(21) Appl. No.: 11/969,198

(22) Filed: Jan. 3, 2008

(65) Prior Publication Data
US 2009/0177691 A1    Jul. 9, 2009

(51) Int. Cl.
*G06F 7/00* (2006.01)

(52) U.S. Cl. .......... 707/705; 707/748
(58) Field of Classification Search .......... None
See application file for complete search history.

(56) References Cited

U.S. PATENT DOCUMENTS

2006/0143068 A1   6/2006   Calabria
2008/0027796 A1*  1/2008   Chaves .......... 705/14

* cited by examiner

*Primary Examiner*—Charles Rones
*Assistant Examiner*—Belix M Ortiz
(74) *Attorney, Agent, or Firm*—Joseph J. Mayo

(57) ABSTRACT

Multi-level reputation based recommendation system and method focused on users as opposed to products or web sites. Establishes reputations of recommenders that may extend beyond a given user's first hand trust of these recommenders. Trust formed between a second and third user based on similar valuations that may not be shared between the first user and the third user may be utilized when recommending something useful for the first user. Reputations are subjective to each user and change over time. Provides recommendations to connect users with blogs, videos, other users, music, books, web sites, reviews, products, vacations spots, hotels, cities, events, activities and ad units for example. Does not rely on the number of static information connections, i.e., links to a given web site, but rather utilize dynamic information as it spreads through the interaction of users. May be utilized in any application or domain where users attribute value to things or actions.

16 Claims, 5 Drawing Sheets

MULTI-LEVEL REPUTATION BASED RECOMMENDATION SYSTEM AND METHOD

BACKGROUND OF THE INVENTION

1. Field of Invention

Embodiments of the invention described herein pertain to computers. More particularly, but not by way of limitation, one or more embodiments of the invention enable a personalized multi-level reputation based recommendation system and method configured to provide recommendations based on user reputation quantified by historical votes that are extended through network analysis. This enables recommendations based on reputations of recommenders at and beyond first hand level of trust of recommenders, i.e., with or without common votes on items respectively.

2. Description of Related Art

The Internet includes millions of active users that are constantly generating content via blog postings, websites and reviews for example. The potential for providing timely, engaging and valuable information that suits a specific user's specific interest and need is great. Yet, finding desirable information is difficult and information overload is a typical result of searching for valuable information. A user can spend large amounts of time sifting through irrelevant and unimportant or unrelated content and miss potentially valuable content that the user would be interested in.

In the physical world, people often make decisions on issues they have not personally evaluated. Instead, people often rely on recommendations made by people that they trust. The trust is built up over time based on past agreements on related issues. The level of trust that a given individual places in another individual is highly subjective and may be influenced and sometimes specifically informed by the level of trust that third party individuals place on that individual.

Search engines exist that allow for the ranking of web pages, based on the number of links to a web page for example. These search engines do not calculate trust for users, but rather place value on websites based on how highly regarded they are, e.g., as ascertained by the number of links to the site by other highly ranked sites. In some implementations, HTML is simply scanned for hyperlinks to sites and the number of hyperlinks to a given URL and the ranking of the linking site determines the relative perceived importance of the web site. This type of ranking of websites provides search results for web pages that are the most highly linked to. This type of ranking is strictly objective and generates a one-size fits all results to keyword searches. It does not take into account the subjective, individual tastes of each user doing the searching.

Collaborative filtering technologies are used for example by certain websites that sell products. Current collaborative filtering implementations do not provide a wide set of recommenders and recommendations. Generally, current collaborative filtering implementations do not provide deep coverage since users may have voted on (or rated/purchased/used) an item in common with a large set of other users that may have completely different tastes. Specifically, recommendations take into account only those recommenders who have direct votes in common with the user yet who as a whole do not necessarily represent a reputable, expert source of recommendations suited to the tastes of that individual searcher. Hence, these recommendations may be inaccurate since the reputations of the recommenders are not taken into account.

New recommendations are provided based on items that a set of users have rated and are not based on what the best recommenders would suggest for example. Many current implementations are shallow, one level systems that do not follow the real world analogy of finding the best recommendations or recommenders to provide recommendations.

With respect to searching for valued information, there is no known system or method that establishes a multi-level network of users with recorded levels of trust derived from rating activity to provide personalized recommendations based on similar valuations of users. Specifically, there is no known system for example that establishes reputations of recommenders beyond a given user's first hand trust of these recommenders. A system which takes into account the reputations of recommenders beyond the given user's first hand trust would improve the scope and accuracy of the recommendations. Hence, there is a need for a multi-level reputation based recommendation system and method.

BRIEF SUMMARY OF THE INVENTION

One or more embodiments of the invention enable a multi-level reputation based recommendation system and method. Embodiments of the invention are focused on the reputations of users as opposed to focusing only qualities or ratings of products or web sites. Embodiments establish reputations of recommenders that may extend beyond a given user's first hand trust of these recommenders. In other words, trust formed between a second and third user based on similar valuations that may not be shared between the first user and the third user may be utilized when recommending something that the third user has found useful.

Hence, embodiments take into account the manner in which people form trust wherein trust is transitive and cumulative in the sense that accumulated trust becomes reputation. Reputations are subjective to each user and change over time. Embodiments of the invention provide recommendations to connect users with blogs, videos, other users, music, books, web sites, reviews, products, vacations spots, hotels, cities, events, activities and advertising ad units, for example. Embodiments may be utilized in any application or domain where users attribute value to things or actions.

A user may have a set of favorite users among the population that may agree on some valuations upon which recommendations may be made for example. In addition, a given user's ratings may be calculated via ratings made by their favorite users in one or more embodiments. For example, calculating a reputation based network for each individual allows each user to be provided with personalized recommendations allowing them to find valuable information based on the ratings of the extended network of reputable users that have historically been held in high regard by the community of users with similar tastes. Thus objects of value discovered through the network of users with high reputations are of high value satisfaction.

In one or more embodiments of the invention, opinions of other users are determined by the summation of agreements of co-votes, ratings or valuations on items or attributes of items. If two users have both voted on a given attribute, e.g., the author of a book (item or attribute of the item), then the agreement between the users is used to form one user's opinions of one another.

If a first user and a third user have no votes in common, yet a second user has votes in common with both the first and third user, then recommendations may be provided to the first user that are in part based on the third user's opinions and reputation. The greater the distance between users, a lower weighting of trust in the opinions of second and third hand distant users may be utilized when calculating reputation.

Mavens, trend setters or taste makers may have a high reputation and their reputation in the system avoids cold start issues since embodiments of the invention tap into these high reputation users even when a new user has few ratings in common with them. For example, a food critic that is highly respected may be utilized for providing recommendations to a large number of users, even users that have only votes on a few items in common with the food critic.

Embodiments of the invention may provide rating predictions for attributes as separate from the items the attributes belong to. Embodiments for example enable the prediction of which members of the attribute class "Author" a user would value highest. Further, items which have not been rated by anyone can be recommended based on the attributes the items include, if these attributes have been rated. This allows embodiments of the invention to predict which newly discovered items a user would value highest.

BRIEF DESCRIPTION OF THE FIGURES

The above and other aspects, features and advantages of the invention will be more apparent from the following more particular description thereof, presented in conjunction with the following drawings wherein.

DETAILED DESCRIPTION OF THE INVENTION

A multi-level reputation based recommendation system and method will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
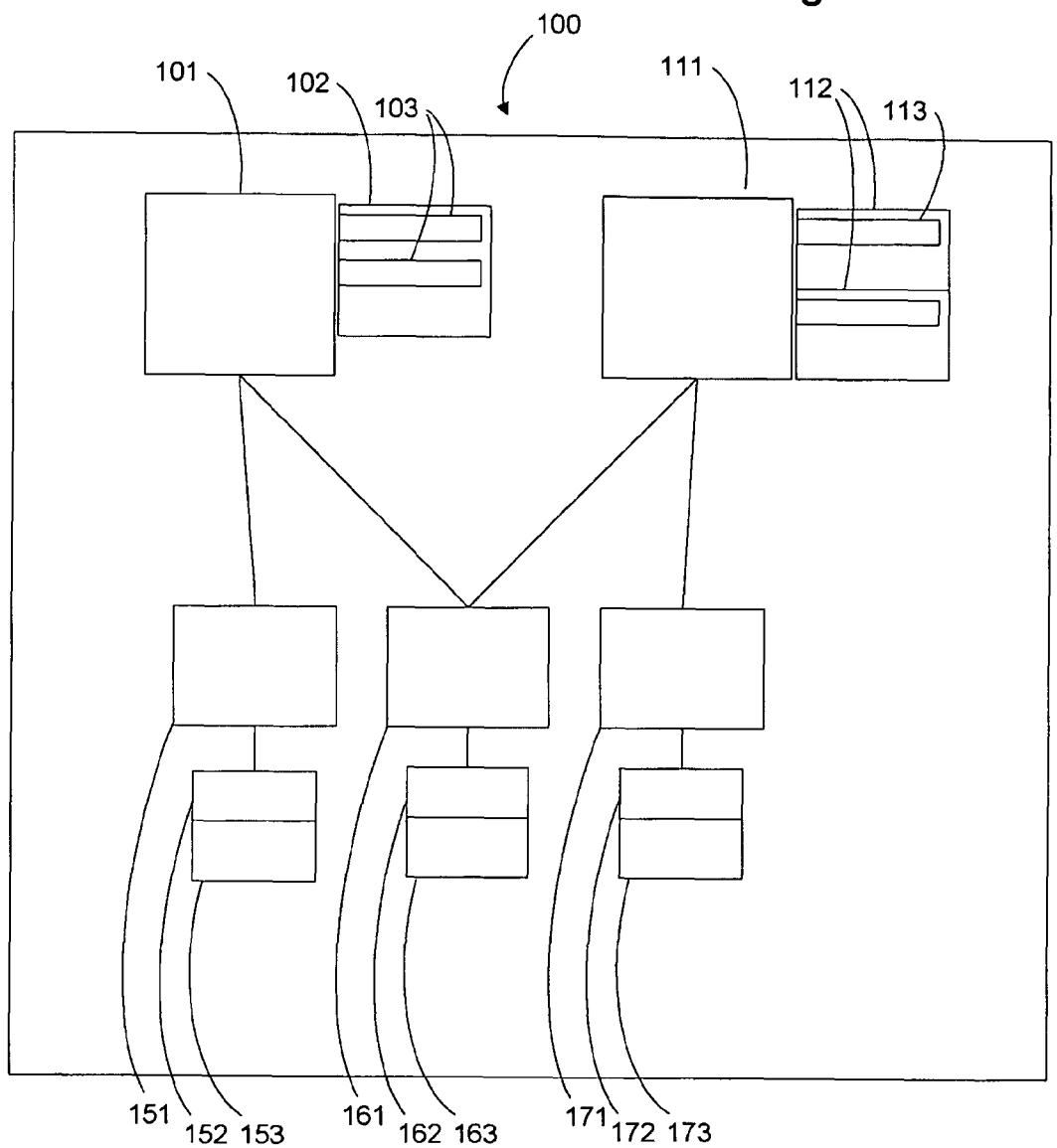
FIG. 1 illustrates a logical view of the system.

FIG. 1 illustrates a logical view of system 100. One or more embodiments may be implemented in a computer for example wherein system 100 may reside within computer memory. The computer may contain memory of any type and execute computer instructions wherein the computer is configured to obtain votes on items and provide a recommendation.

As shown in FIG. 1, item 101 has been rated by users 151 and 161, while item 111 has been rated by users 161 and 171. Item 101 has at least one attribute class 102 with associated attributes 103. Item 111 is shown with two attribute classes 112 each having one attribute. There is no limit to the number of items, attribute classes or attributes that may be utilized in embodiments of the invention. The lines between users and items in this figure signify that the user connected to an item has rated that item. A rating for example includes any type of user behavior towards an item that indicates favor or disfavor, such as direct rating, purchasing, returning, bookmarking, time listening to a song, repeat visits, click-throughs on an ad, or any other type of attention data that an application may gather. Each user has opinions of other users when the users share ratings on objects, hence opinions 152 and 162 contain data with respect to users 151 and 161 while opinions 162 and 172 contain data associated with users 161 and 171 respectively. Reputations 153, 163 and 173 may contain data associated with all three users 151, 161 and 171 since users 151 and 171 are linked by user 161 that shares opinions of both users 151 and 171.

Embodiments of the invention may obtain ratings of items 101 or 111 or attribute classes 102 or 112 or attributes 103 or 113 for example. Ratings of items, attribute classes or attributes are obtained and associated with users 151, 161 and 171 for example in a data structure. Ratings may be registered against each of the attributes associated with an item. For example a rating on an item may associate the rating with any or all attribute classes and attributes associated with the item. Attributes may each belong to an attribute class and at any point in time, embodiments of the invention may track any number of attributes in any number of attribute classes. For example, an attribute class may be "author" wherein multiple authors (attributes) may be associated with a single item (book). Another example of attribute class may be "identity" where each item may be associated with a unique attribute or key, i.e., "id" for example. Embodiments of the invention may associate an item with any number of attributes of any number of attribute classes including multiple attributes of a single class. For example, an item such as an album may have multiple attributes such as artists under one attribute class "artist class".

Predictions are made in one or more embodiments of the invention for each user based on ratings. For example, a user may vote on an item which translates to the assignment of rating to each of the attributes associated with the item at the time of the vote. Rating may be implemented as a real number in the interval [−k;k] where positive ratings indicate a favorable rating while negative ratings indicate unfavorable ratings. Zero may indicate indifference of the user. If users 161 and 171 have rated item 111 highly (or the attributes associated with item 111), then a prediction of item 111 for user 151 has a high probability of being a good recommendation as long as users 151, 161 and 171 have high enough opinions of each other and hence high enough reputations.

Figure 4:
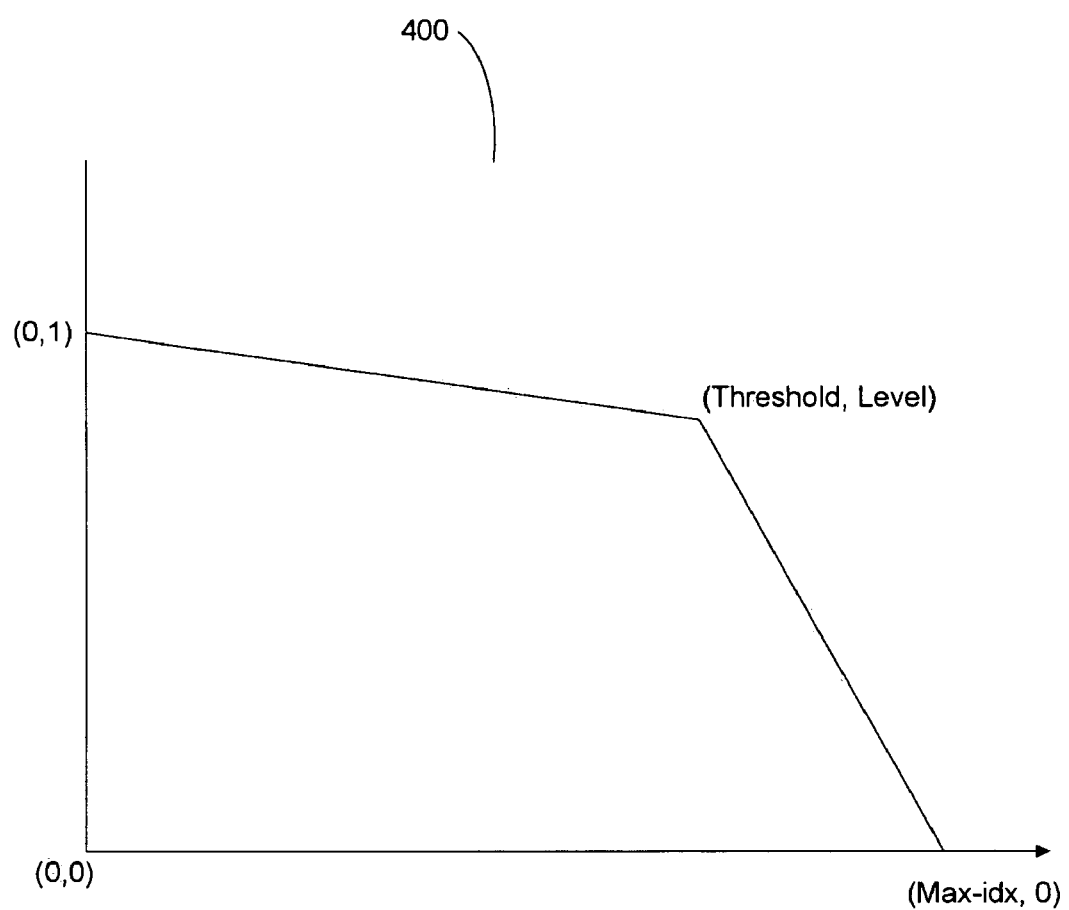
FIG. 4 illustrates a threshold and level embodiment.

FIG. 4 illustrates a threshold and level embodiment of the confidence function.

Rating confidence is utilized to quantify the confidence in the accuracy of the rating. Rating confidence may be implemented as a function of how recent the rating was obtained and is in the interval of [0;1] with the most recent rating being 1 with less recent ratings decreasing in value. In one or more embodiments, the rating confidence is calculated by relating the index of a vote in the user's vote history to the rating confidence. Since some users have cast few votes, while others may have cast many votes, to avoid a steep decrease in the confidence for users with few votes, "threshold" and "level" may also be utilized. "Threshold" and "level" ensure that confidence does not fall below "level" for votes with indices below "threshold" in one or more embodiments. For example, if a user's most recent index is zero and the index of the user's least recent vote is max−idx, then the confidence function yields values on the lines:

(x0=0, y0=1), (x1=threshold, y1=level)

and x1=threshold, y1=level), (x2=max−idx, y2=0)

If a given user has less than "threshold" votes, then the confidence function may yield values on the first line for example.

Threshold and level are arbitrary and may be deduced empirically.

A given user may cast multiple votes or ratings on the same attribute over time for example. For example, a user can rate multiple different books (the items) by author (the attribute class), e.g., Shakespeare (the attribute). Consideration is utilized to facilitate a comparison between multiple ratings of users of a single attribute. In one or more embodiments, the set of user ratings of a given attribute are aggregated into a scalar value that represents consideration. In one or more embodiments, consideration is the average of all of a given user's ratings of a given attribute. At any given point in time a user has a single consideration of a given attribute. For example a user has a particular consideration of a particular author based on multiple books by the particular author. Consideration may be implemented as a real number in the interval $[-k;k]$ for example.

Each Consideration may be associated with a Consideration Confidence which is a measure of the confidence of the accuracy of the Consideration. Consideration confidence is the sum of the rating confidences of a user's ratings on a given attribute scaled to the interval $[0;1]$. Consideration confidence in one or more embodiments may be calculated by normalizing or dividing each confidence by the largest confidence in its attribute class for example.

Agreement is calculated for and between users that have a consideration of a given attribute. Agreement may be implemented with a real number. In one or more embodiments of the invention, agreement falls in the interval $[-1;1]$. If the consideration values are the same for two users, and either extreme positive or negative, then the resulting agreement may be set to one for example. If the considerations are the extreme opposite of each other then the agreement may be set to negative one for example. If agreement values are approximately the same, the agreement is positive and relatively significant in one or more embodiments. Hence, the agreement between two consideration values that are both close to zero but of differing signs may be set to a positive significant value for example.

One embodiment of a formula which may be utilized in embodiments of the invention is:

$$Ax,y=(2+x*y/rmax2-|x-y|/2/rmax))/1.5-1$$

where x and y are consideration values and rmax is the maximum possible consideration value.

Figure 2:
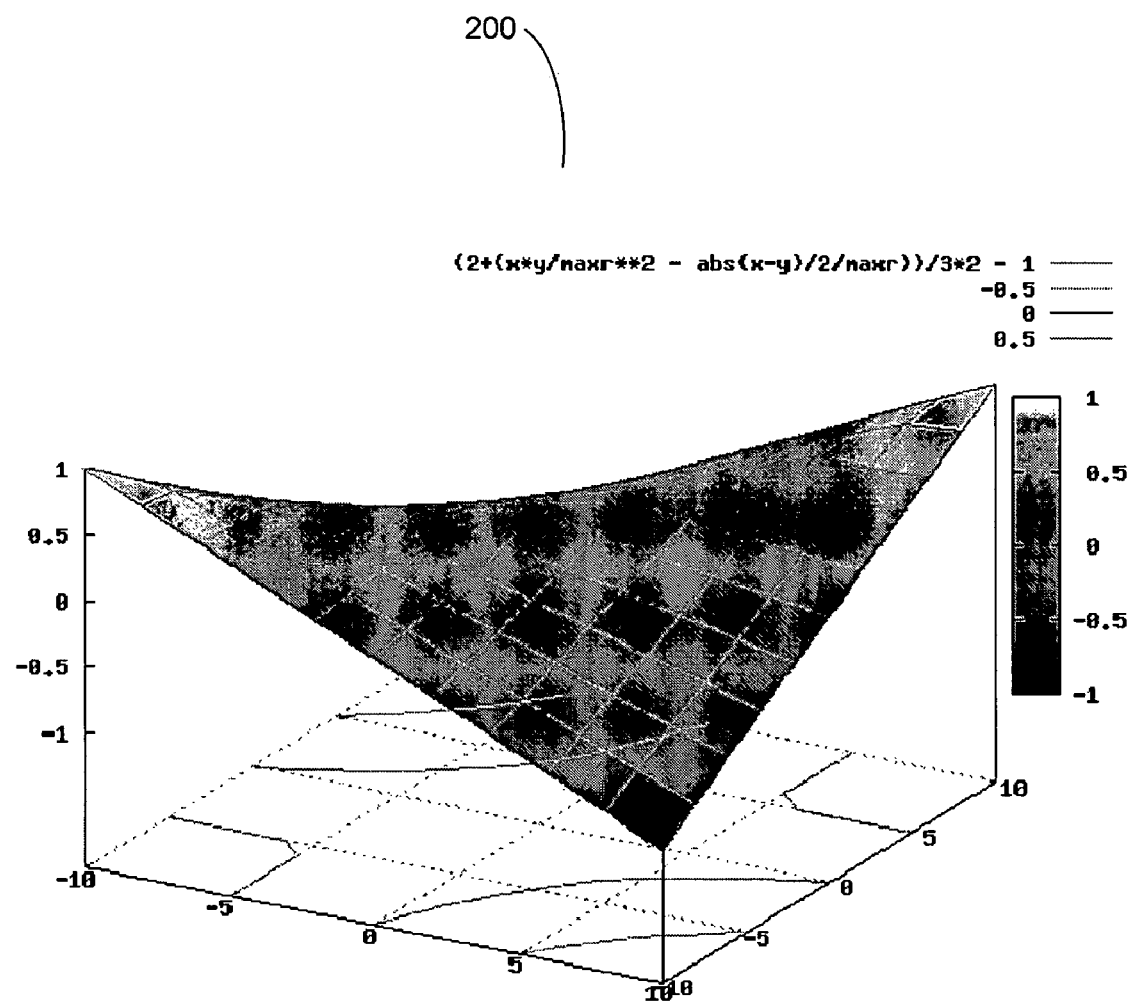
FIG. 2 illustrates a graph depicting an embodiment of the agreement calculation.

FIG. 2 illustrates a graph depicting an embodiment of the agreement calculation, specifically the surface plot of Ax,y 200.

In order to emphasize agreements based on consideration with higher confidences, the agreements may be weighted by consideration confidences.

$$CWA=Agreement*ConfidenceX*ConfidenceY$$

where ConfidenceX and ConfidenceY are the confidences of the constituent considerations.

Each attribute class has an associated relative weight which is a measure of the extent to which agreements on attributes of that class are indicative of user's opinions of each other. In one or more embodiments, attribute class weight is in the interval of $[0;1]$ where 1 is the weight of the most significant attribute class. Attribute class weights may be arbitrary and deduced empirically for example.

Any two users connected by one or more agreements have a single agreement sum. The agreement sum may be implemented as a real number that is a summation of the confidence weighted agreement each further weighted by the appropriate attribute class weight.

An opinion describes a first user's opinion of a second user on the basis of their agreements. Opinions may be implemented in the interval $[-\infty,1]$ and may be calculated by normalizing or dividing each agreement sum by the highest agreement sum that the first user has for any other user. Since the highest agreement sum most likely is different between users, the first user's opinion of the second user generally differs for the second user's opinion of the first user despite the fact that the opinions are based on the same agreement sum.

In implementations users have opinions with large numbers of other users, many of the opinions may be of marginal or negative value and use of these other users for predictions for a given user are generally not productive. In order to use system resources efficiently, one or more embodiments of the invention considers only users of whom a given user holds a high opinion.

Figure 3:
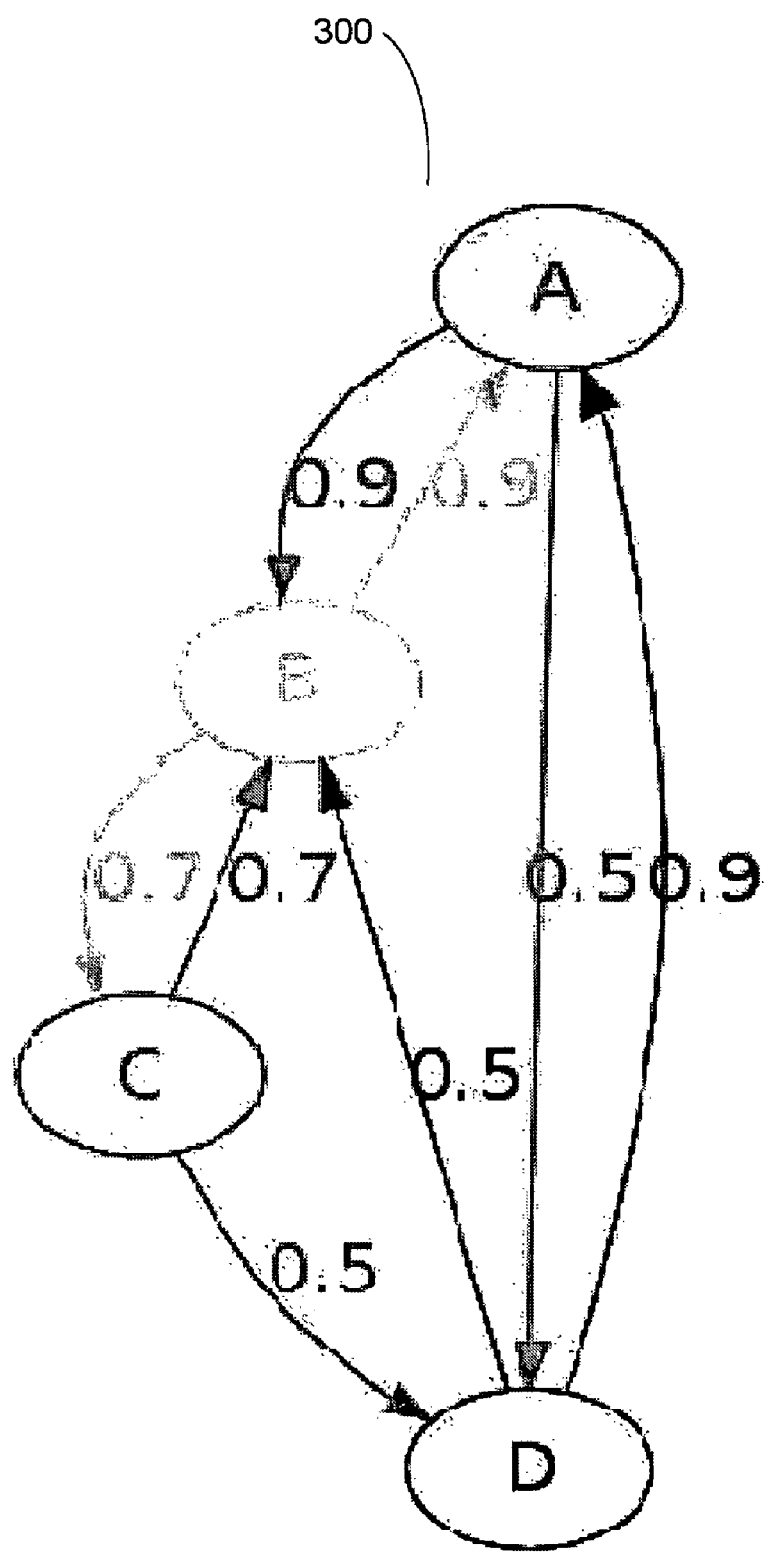
FIG. 3 illustrates an opinion graph.

FIG. 3 illustrates an opinion graph. For the purpose of illustration, opinions may be viewed as a graph. In FIG. 3, the vertices are users and the edges are opinions. The graph is directed and weighted. In one or more embodiments of the invention, only a user's opinions and his/her favorites are utilized to save computing resources.

Reputation is an extension of opinion and is calculated by taking the other users opinions into account. Reputations can be calculated indirectly between users who have no opinions of one another by "hopping" via users that they do have opinions with. Hence embodiments of the invention may derive reputations using indirect second hand information. In implementations that have a reasonable number of users, reputations are calculated using a combination of a user's own opinion and his/her favorite's opinions. With respect to FIG. 3, in one or more embodiments of the invention, user B's reputation in the eyes of user A is calculated by adding the values of the acyclic paths of the opinion graph which connects user A to user B.

The value of each path may be calculated as the product of the weights of all edges (opinions) making up the path. Each hop is further multiplied by a normalization factor which is a function of the distance from user A to the relevant user. The distance may be counted as the number of hops for example. Hence second and third hand opinions receive less and less value respectively. The normalization factor is arbitrary and may be deduced empirically for example. Less significant paths may be left out of the calculations to save system resources in one or more embodiments of the invention.

TABLE 1

Reputations of example opinions shown in FIG. 2.
Reputations for example opinions

| U1 | U2 | Path | Calculation | Path Value | Reputation |
|---|---|---|---|---|---|
| A | | | | | |
| | B | | | | |
| | | A, B | 0.9 | 0.9 | |
| | | A, D, B | 0.5 * 0.5 | 0.25 | |
| | | | | | 1.15 |
| | C | | | | |
| | | A, B, C | 0.9 * 0.7 | 0.63 | |
| | | A, D, B, C | 0.5 * 0.5 * 0.7 | 0.18 | |
| | | | | | 0.81 |

TABLE 1-continued

Reputations of example opinions shown in FIG. 2.
Reputations for example opinions

| U1 | U2 | Path | Calculation | Path Value | Reputation |
|---|---|---|---|---|---|
|  | D |  |  |  |  |
|  |  | A, D | 0.5 | 0.5 |  |
|  |  | A, B, C, D | 0.9 * 0.7 * 0.5 | 0.32 |  |
|  |  |  |  |  | 0.82 |
| B |  |  |  |  |  |
|  | A |  |  |  |  |
|  |  | B, A | 0.9 | 0.9 |  |
|  |  | B, C, D, A | 0.7 * 0.5 * 0.9 | 0.32 |  |
|  |  |  |  |  | 1.22 |
|  | C |  |  |  |  |
|  |  | B, C | 0.7 | 0.7 |  |
|  |  |  |  |  | 0.7 |

As can be seen from the above calculations user A and user B value each other differently.

Analogous to favorites of opinions, reputation set is a subset of all of the calculated reputations from the point of view of a given user. The subset contains only the users with the highest reputations and this subset may be utilized in calculating predictions.

A prediction predicts the rating that a given user would assign to a given item or attribute if the user were to rate the item or attribute. The prediction may be determined by consulting the user's reputation set to determine the considerations if any that members of this set have of a given attribute. Prediction confidence may be calculated as the sum of the reputation weighted consideration confidences for a given attribute for example.

Recommendations for users may be generated for specific users based on predictions for a given user with respect to a list of attributes, e.g., item identities. Embodiments of the invention calculate predictions and prediction confidences for each attribute to produce a list of recommendations. Hence, embodiments of the invention provide targeted recommendations that are of high value since they are based on reputations.

Figure 5:
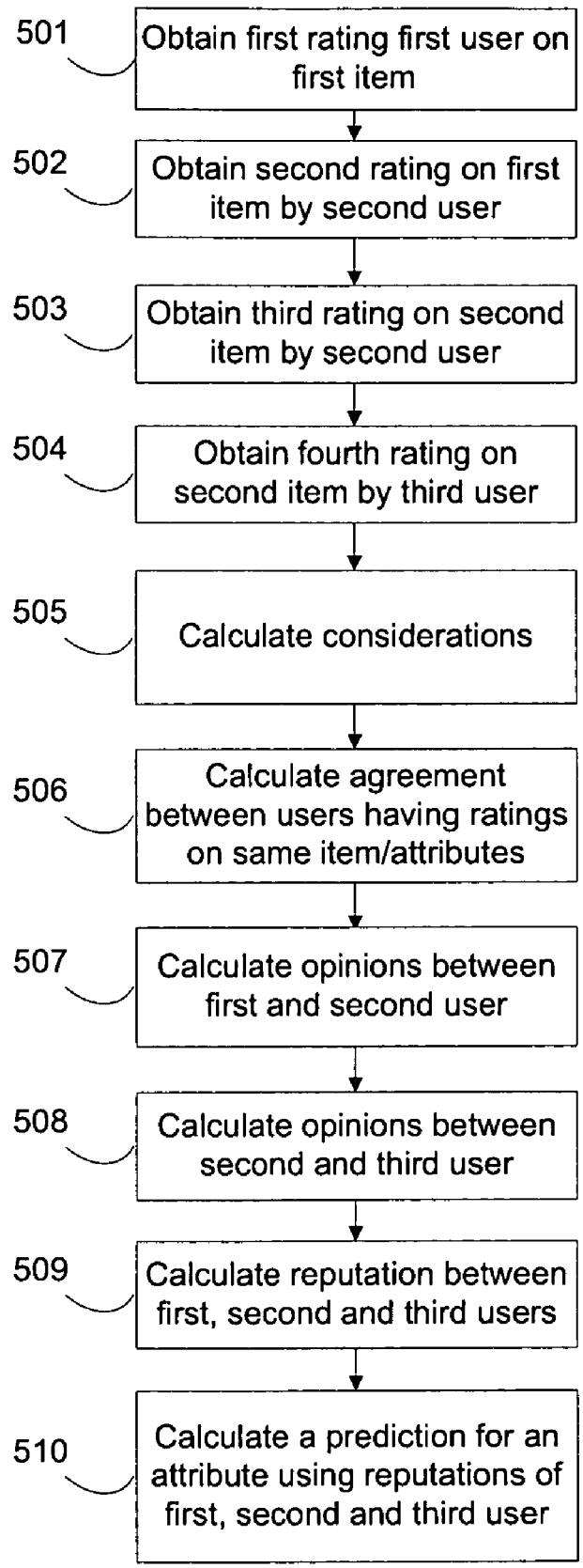
FIG. 5 is a flow chart of an embodiment of the algorithm of the invention for determining reputation and recommendations.

FIG. 5 is a flow chart of an embodiment of the algorithm for determining reputation and recommendations. The system obtains a rating of a first item from a first user at 501. A second rating on the first item is obtained from a second user at 502. A third rating on a second item is obtained from the second user at 503. A fourth rating on a second item is obtained from a third user at 504. See FIG. 1 for a graphical depiction of the relationships detailed in FIG. 5. As previously described above, the calculations for each quantity depicted in FIG. 5 may be made according to the detailed descriptions described above in this section. In this example, user 151 and user 171 have no ratings on items in common, yet a recommendation to user 151 may take into account user 171's ratings as well as user 161's ratings. Considerations are calculated on items at 505, any method of calculating considerations based on like ratings on items between users may be utilized in embodiments of the invention. Agreements are calculated between the users at 506. The opinions between all the various agreements of the first and second users is calculated at 507. The opinions between all the various agreements of the second and third users is calculated at 508. The reputations of the first, second and third users are calculated at 509 which may thus use indirect ratings in which to calculate reputation. A prediction on an item or attribute class or attribute using weighted reputations is calculated at 510. The highest predictions may be provided as recommendations in one or more embodiments. For example, item 111 may be recommended to user 151 based on the reputations of users 161 and 171.

While the invention herein disclosed has been described by means of specific embodiments and applications thereof, numerous modifications and variations could be made thereto by those skilled in the art without departing from the scope of the invention set forth in the claims.

What is claimed is:

1. A reputation based recommendation system comprising:
a computer memory;
a computer processing unit;
a computer comprising said computer memory and said computer processing unit wherein said computer is configured to:
obtain a first rating from a first user on a first item;
obtain a second rating from a second user on said first item;
obtain a third rating from said second user on a second item;
obtain a fourth rating from a third user on said second item;
assign said first rating and said second rating on said first item to item attributes associated with said first item and assign said third rating and said fourth rating to item attributes associated with said second item;
calculate a first consideration of ratings obtained from said first user on a first item attribute selected from attributes associated with said first item;
calculate a second consideration of ratings obtained from said second user on said first item attribute selected from attributes associated with said first item;
calculate a third consideration of ratings obtained from said second user on a second item attribute selected from attributes associated with said second item;
calculate a fourth consideration of ratings obtained from said third user on said second item attribute selected from attributes associated with said second item;
calculate a first agreement between said first user and said second user via said first consideration and said second consideration wherein similar considerations provide a higher level of agreement than dissimilar considerations;
calculate a second agreement between said second user and said third user via said third consideration and said fourth consideration wherein similar considerations provide said higher level of agreement than said dissimilar considerations;
calculate agreement sums for all agreements between said first user and said second user and said second user and said third user;
calculate an opinion of said first user with respect to said second user and said second user with respect to said third user based on said agreement sums;
calculate a reputation of said third user with respect to said first user based on opinions between said first user and said second user and between said second user and said third user based on network path analysis where users are vertices and opinions are edges wherein said reputation is formed via summation of values of acyclic paths which connect said first user and said third user, and where each acyclic path value is calculated as a product of weights of at least one edge or opinion that makes up said acyclic path and where each hop is adjusted by a normalization factor that represents a distance from said first user; and, calculate at least one prediction for said first user on an arbitrary item by calculating a reputation weighted average of a plurality of ratings on said arbitrary item or attribute associated with said item by users who have a reputation with respect to said first user.

2. The reputation based recommendation system of claim 1 wherein said computer is further configured to:
   modify said first rating via a rating confidence factor wherein said rating confidence factor is a function of time and wherein said rating confidence factor decreases in value with time.

3. The reputation based recommendation system of claim 1 wherein said computer is further configured to:
   modify said first rating via a rating confidence factor wherein said rating confidence factor does not fall below a level when a number of votes is below a threshold.

4. The reputation based recommendation system of claim 1 wherein said computer is further configured to:
   modify said first consideration via normalization of each confidence by a largest confidence in an attribute class.

5. The reputation based recommendation system of claim 1 wherein said computer is further configured to:
   modify said first agreement through a confidence weighting.

6. The reputation based recommendation system of claim 1 wherein said computer is further configured to:
   modify said agreement sums by a attribute class weight factor.

7. The reputation based recommendation system of claim 1 wherein said computer is further configured to:
   add said second user to a list of favorite users for said first user.

8. The reputation based recommendation system of claim 1 wherein said computer is further configured to:
   modify said prediction via a sum of reputation weighted consideration confidences for a given attribute.

9. A reputation based recommendation method comprising:
   obtaining a first rating from a first user on a first item;
   obtaining a second rating from a second user on said first item;
   obtaining a third rating from said second user on a second item;
   obtaining a fourth rating from a third user on said second item;
   assigning said first rating and said second rating on said first item to item attributes associated with said first item and assigning said third rating and said fourth rating to item attributes associated with said second item;
   calculating a first consideration of ratings obtained from said first user on a first item attribute selected from attributes associated with said first item;
   calculating a second consideration of ratings obtained from said second user on said first item attribute selected from attributes associated with said first item;
   calculating a third consideration of ratings obtained from said second user on a second item attribute selected from attributes associated with said second item;
   calculating a fourth consideration of ratings obtained from said third user on said second item attribute selected from attributes associated with said second item;
   calculating a first agreement between said first user and said second user via said first consideration and said second consideration wherein similar considerations provide a higher level of agreement than dissimilar considerations;
   calculating a second agreement between said second user and said third user via said third consideration and said fourth consideration wherein similar considerations provide said higher level of agreement than said dissimilar considerations;
   calculating agreement sums for a plurality of agreements between said first user and said second user and said second user and said third user;
   calculating an opinion of said first user with respect to said second user and said second user with respect to said third user based on said agreement sums;
   calculating a reputation of said third user with respect to said first user based on opinions between said first user and said second user and between said second user and said third user based on network path analysis where users are vertices and opinions are edges wherein said reputation is formed via summation of values of acyclic paths which connect said first user and said third user, and where each acyclic path value is calculated as a product of weights of at least one edge or opinion that makes up said acyclic path and where each hop is adjusted by a normalization factor that represents a distance from said first user; and,
   calculating at least one prediction for said first user on an arbitrary item by calculating a reputation weighted average of a plurality of ratings on said arbitrary item or attribute associated with said item by users who have a reputation with respect to said first user.

10. The reputation based recommendation method of claim 9 further comprising:
    modifying said first rating via a rating confidence factor wherein said rating confidence factor is a function of time and wherein said rating confidence factor decreases in value with time.

11. The reputation based recommendation method of claim 9 further comprising:
    modifying said first rating via a rating confidence factor wherein said rating confidence factor does not fall below a level when a number of votes is below a threshold.

12. The reputation based recommendation method of claim 9 further comprising:
    modifying said first consideration via normalization of each confidence by a largest confidence in an attribute class.

13. The reputation based recommendation method of claim 9 further comprising:
    modifying said first agreement through a confidence weighting.

14. The reputation based recommendation method of claim 9 further comprising:
    modifying said agreement sums by a attribute class weight factor.

15. The reputation based recommendation method of claim 9 further comprising:
    adding said second user to a list of favorite users for said first user.

16. The reputation based recommendation method of claim 9 further comprising:
    modifying said prediction via a sum of reputation weighted consideration confidences for a given attribute.

* * * * *